United States Patent
Olmes et al.

(10) Patent No.: US 7,810,332 B2
(45) Date of Patent: Oct. 12, 2010

(54) GAS TURBINE WITH HEAT EXCHANGER FOR COOLING COMPRESSED AIR AND PREHEATING A FUEL

(75) Inventors: Sven Olmes, Villigen (CH); Wilhelm Reiter, Kuessaberg (DE); Thomas Zierer, Ennetbaden (CH)

(73) Assignee: Alstom Technology Ltd, Baden (CH)

( * ) Notice: Subject to any disclaimer, the term of this patent is extended or adjusted under 35 U.S.C. 154(b) by 1035 days.

(21) Appl. No.: 11/548,992

(22) Filed: Oct. 12, 2006

(65) Prior Publication Data

US 2007/0095072 A1 May 3, 2007

(30) Foreign Application Priority Data

Oct. 12, 2005 (CH) .................................... 1657/05

(51) Int. Cl.
*F02C 1/00* (2006.01)
*F02G 3/00* (2006.01)
(52) U.S. Cl. ........................... 60/728; 60/791; 60/39.17
(58) Field of Classification Search ................... 60/728, 60/782, 785, 795, 39.17, 791, 736, 806, 39.83
See application file for complete search history.

(56) References Cited

U.S. PATENT DOCUMENTS

| | | | |
|---|---|---|---|
| 2,487,842 A | 11/1949 | Whiteman et al. | |
| 2,970,437 A | 2/1961 | Anderson | |
| 3,796,045 A * | 3/1974 | Foster-Pegg | 60/772 |
| 4,896,499 A * | 1/1990 | Rice | 60/792 |
| 5,161,365 A * | 11/1992 | Wright | 60/780 |
| 5,392,614 A | 2/1995 | Coffinberry | |
| 5,414,992 A | 5/1995 | Glickstein | |
| 5,465,569 A * | 11/1995 | Althaus et al. | 60/773 |
| 5,513,488 A * | 5/1996 | Fan | 60/775 |
| 5,577,378 A | 11/1996 | Althaus et al. | |
| 5,724,806 A * | 3/1998 | Horner | 60/785 |
| 5,884,470 A * | 3/1999 | Frutschi | 60/783 |
| 6,223,523 B1* | 5/2001 | Frutschi | 60/775 |
| 6,305,156 B1* | 10/2001 | Lui | 60/785 |
| 6,415,595 B1* | 7/2002 | Wilmot et al. | 60/785 |
| 6,539,723 B2* | 4/2003 | Bronicki et al. | 60/774 |
| 6,705,073 B2* | 3/2004 | Braun et al. | 60/39.3 |
| 7,111,462 B2* | 9/2006 | Epstein | 60/774 |
| 7,478,525 B2* | 1/2009 | Iya et al. | 60/204 |
| 2004/0144099 A1* | 7/2004 | Coleman et al. | 60/791 |
| 2008/0104938 A1* | 5/2008 | Finkenrath et al. | 60/39.5 |

OTHER PUBLICATIONS

Franz Joos, Philipp Brunner; Marcel Stalder, Stefan Tschirren, "Field experience with the sequential combustion system of the GT24/GT26 gas turbine family", ABB Review May 1998, Gas Turbines, pp. 12-20.

* cited by examiner

*Primary Examiner*—William H Rodríguez
(74) *Attorney, Agent, or Firm*—Leydig, Voit & Mayer, Ltd.

(57) ABSTRACT

A gas turbine includes a compressor for compressing the combustion air, at least one combustion chamber, in which a fuel is burned while compressed combustion air is supplied, and at least one first turbine arranged downstream of the combustion chamber and in which the hot combustion gases from the combustion chamber are expanded to perform work. Part of the compressed combustion air is branched off, cooled in a cooling air cooler, brought to a lower cooling air pressure by a second turbine and supplied to the gas turbine for cooling purposes.

8 Claims, 4 Drawing Sheets

GAS TURBINE WITH HEAT EXCHANGER FOR COOLING COMPRESSED AIR AND PREHEATING A FUEL

Priority is claimed to Swiss Patent Application No. CH 01657/05, filed on Oct. 12, 2005, the entire disclosure of which is incorporated by reference herein.

The present invention relates generally to the field of gas turbines, and in particular to a gas turbine with cooling air cooling.

BACKGROUND

The prior art discloses gas turbines (Field experience with the sequential combustion system of the GT24/GT26 gas turbine family, ABB Review 5/1998, page 12 et seq), in which the cooling air required for the turbine is passed in an MBH30 system through external cooling air ducts from the compressor into a separate cooling air cooler, re-cooled there and then made available to the turbine. The MBH30 system refers here to a secondary air system of the GT24/GT26 gas turbines, in which air branched off from the compressor after stage 16, which is at a pressure of approximately 20 bar, is used for cooling turbine components (mainly blades). The air exchanged in the cooling air cooler is passed on within a combined heat and power generating plant equipped with the gas turbine to the combined cycle and to the downstream steam circuit.

Such a known gas turbine is represented in a schematized form in FIG. 1 (see also U.S. Pat. No. 5,577,378, which is incorporated by reference herein). The gas turbine 10 of FIG. 1 comprises a compressor 11 for compressing the combustion air and discharging the compressed combustion air into a plenum 12, a first combustion chamber 13, which follows the compressor 11 and in which a fuel is burned while compressed combustion air is supplied, a first turbine 14, in which the hot combustion gases from the first combustion chamber 13 are expanded to perform work, a second combustion chamber 15 and a second turbine 16, arranged downstream of the second combustion chamber 15. Part of the compressed combustion air is branched off from the plenum 12 by means of a cooling air duct 17, cooled in a cooling air cooler 18 and used for cooling the gas turbine.

For safety and operational reasons (for special operating conditions), a pressure reserve is provided in the design of the cooling system. By means of a throttling device 19 in the form of orifice plates in the cooling air duct 17, the pressure is throttled back to the target pressure (cooling air pressure $p_{cool}$) required in the turbine. Excessive pressure in the turbine cooling system would result in an unnecessarily great amount of cooling air being used. The throttling is checked during commission and if need be set to the machine (by appropriate choice of the orifice plates). However, throttling entails loss of exergy, which could otherwise be used in expansion.

SUMMARY OF THE INVENTION

An object of the present invention is to provide a gas turbine with cooling air cooling in which the throttling of the cooling air for the gas turbine can be made usable.

The present invention provides a gas turbine with a compressor for compressing the combustion air, at least one combustion chamber, in which a fuel is burned while compressed combustion air is supplied, and at least one first turbine, which is arranged downstream of the combustion chamber and in which the hot combustion gases from the combustion chamber are expanded to perform work, part of the compressed combustion air being branched off, cooled in a cooling air cooler, brought to a lower cooling air pressure by means for obtaining a pressure reduction and supplied to the gas turbine for cooling purposes, the means for obtaining a pressure reduction comprising a second turbine. The concept of the invention uses the exergy that is normally dissipated by the throttling in "re-heat" machines.

A first configuration of the invention is characterized in that the second turbine is controllable. The use of a controllable or regulable turbine in the pipeline system allows part of the "throttling energy" to be recovered. Moreover, this turbine can be set or electronically regulated to the needs regarding cooling air pressure, which differ from machine to machine, by an adjustment of the stationary blades. In particular, a regulating device which regulates the cooling air pressure by controlling the second turbine is provided for this purpose.

The second turbine is preferably arranged upstream of the cooling air cooler.

A development is distinguished by the fact that the second turbine drives a generator. The shaft output of the second turbine that is obtained can be fed into the power network by means of the generator and therefore increase the overall efficiency of the plant.

Another development is distinguished by the fact that a gas is used as the fuel, and that the second turbine drives a gas compressor for compressing the fuel. Specifically the GT24/26 that was mentioned at the beginning requires high pressures in the fuel system (about 50 bar). Lower pressures usually prevail in the supply lines from the gas network, which generally has the result that the equipment of the gas turbine includes a gas compressor which is driven by an electric motor. Depending on the starting pressure level, the compressor requires up to 3 MW of drive power. Part of the drive power could be supplied by the second (cooling air) turbine. The cooling air turbine could be coupled to the electric motor of the compressor by means of an overrunning clutch, in which case the electric motor would automatically supply the power shortfall.

As a further alternative, the shaft output obtained can also be dissipated again elsewhere and consequently the fuel could be heated (in a way similar to a hydraulic dynamometer in test turbines). This happens if, according to another development, the second turbine drives a fuel preheating device in which the fuel is heated by converting kinetic energy into heat. This would preferably be done with liquid fuel, because of the simpler technical solution. Consequently, the "throttling energy" would be advantageously used and fed to the highest energy level in the cyclic process, which would lead to an "optimum" yield with regard to power and efficiency, and would be better than displacing thermal energy into the steam circuit.

BRIEF EXPLANATION OF THE DRAWINGS

The invention is to be explained in more detail below on the basis of exemplary embodiments in connection with the drawings, in which.

DETAILED DESCRIPTION

Figure 1:
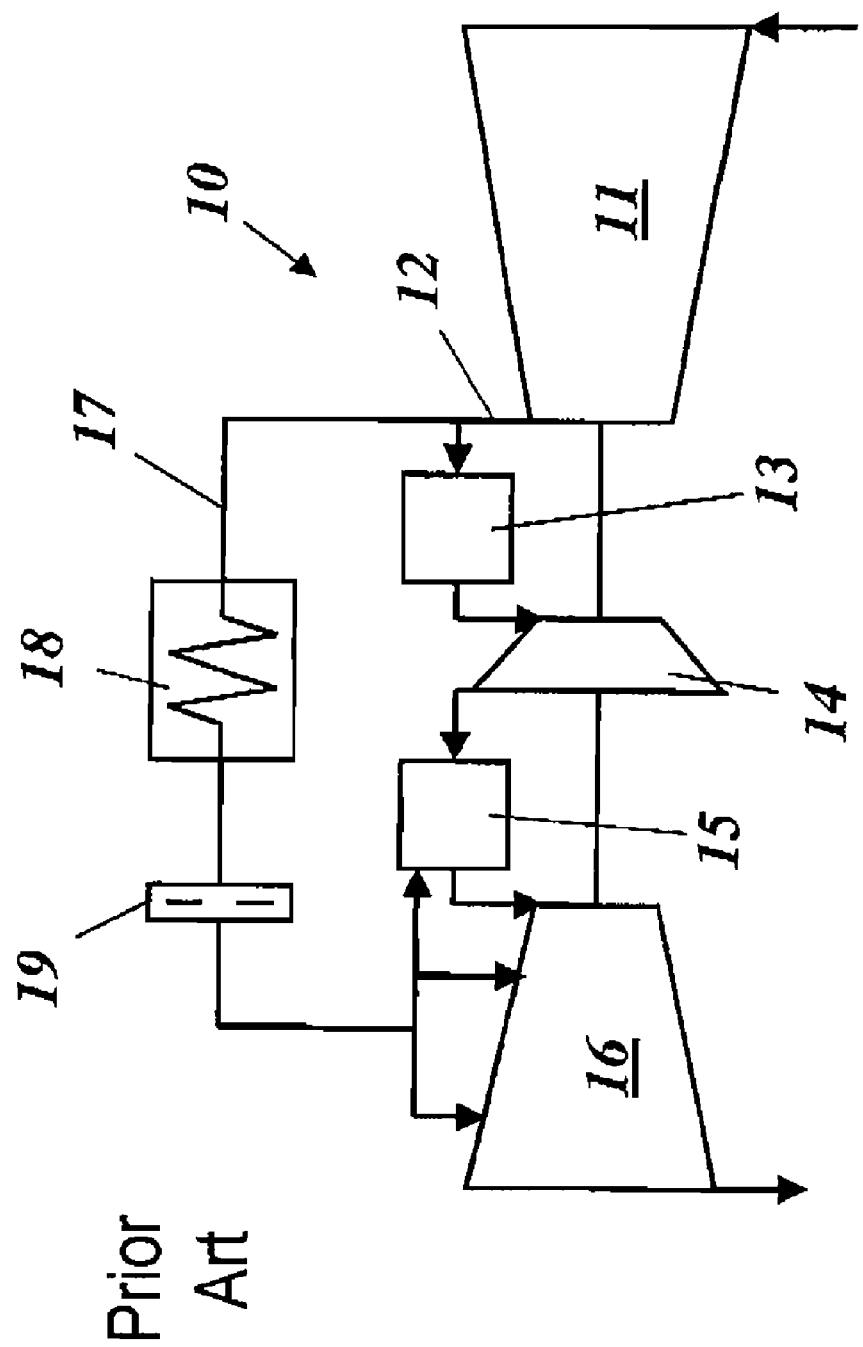
FIG. 1 shows a gas turbine in a schematized representation, with cooling air cooling according to the prior art.
Figure 2:
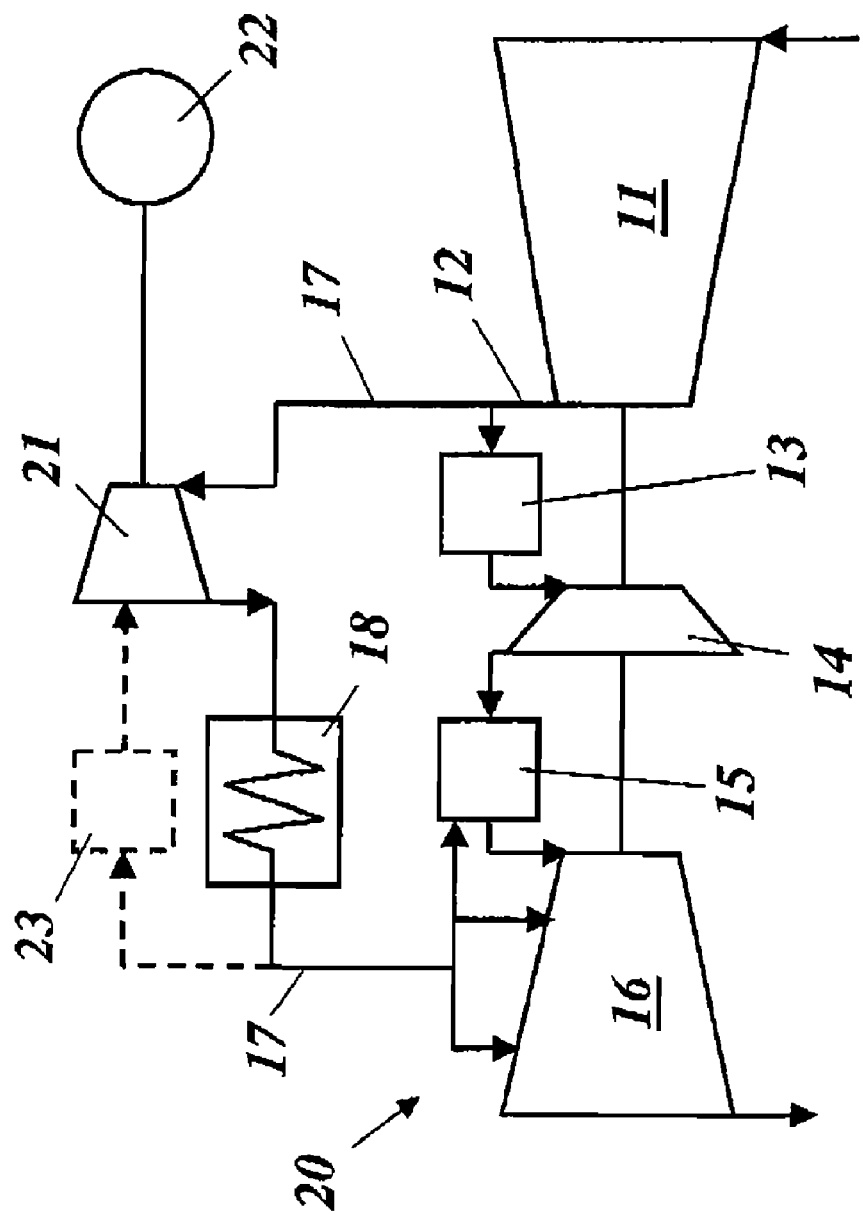
FIG. 2 shows a first exemplary embodiment of a gas turbine according to the invention in a representation comparable to FIG. 1, with an additional turbine in the cooling air duct, which drives a generator.

In FIG. 2, a first exemplary embodiment of a gas turbine 20 according to the invention, in which the exergy occurring as a result of throttling is used in the process, is reproduced in a representation comparable to FIG. 1. Arranged for this purpose in the cooling air duct 17 is an additional regulable turbine 21, the shaft output of which is put to further use. The cooling air is expanded in the turbine 21 to the desired cooling air pressure, which can be adjusted to this value by a regulating device 23. The turbine 21 drives a generator 22, the electrical energy of which can be fed in particular into the power network if the gas turbine is operating in a power generating plant.

Figure 3:
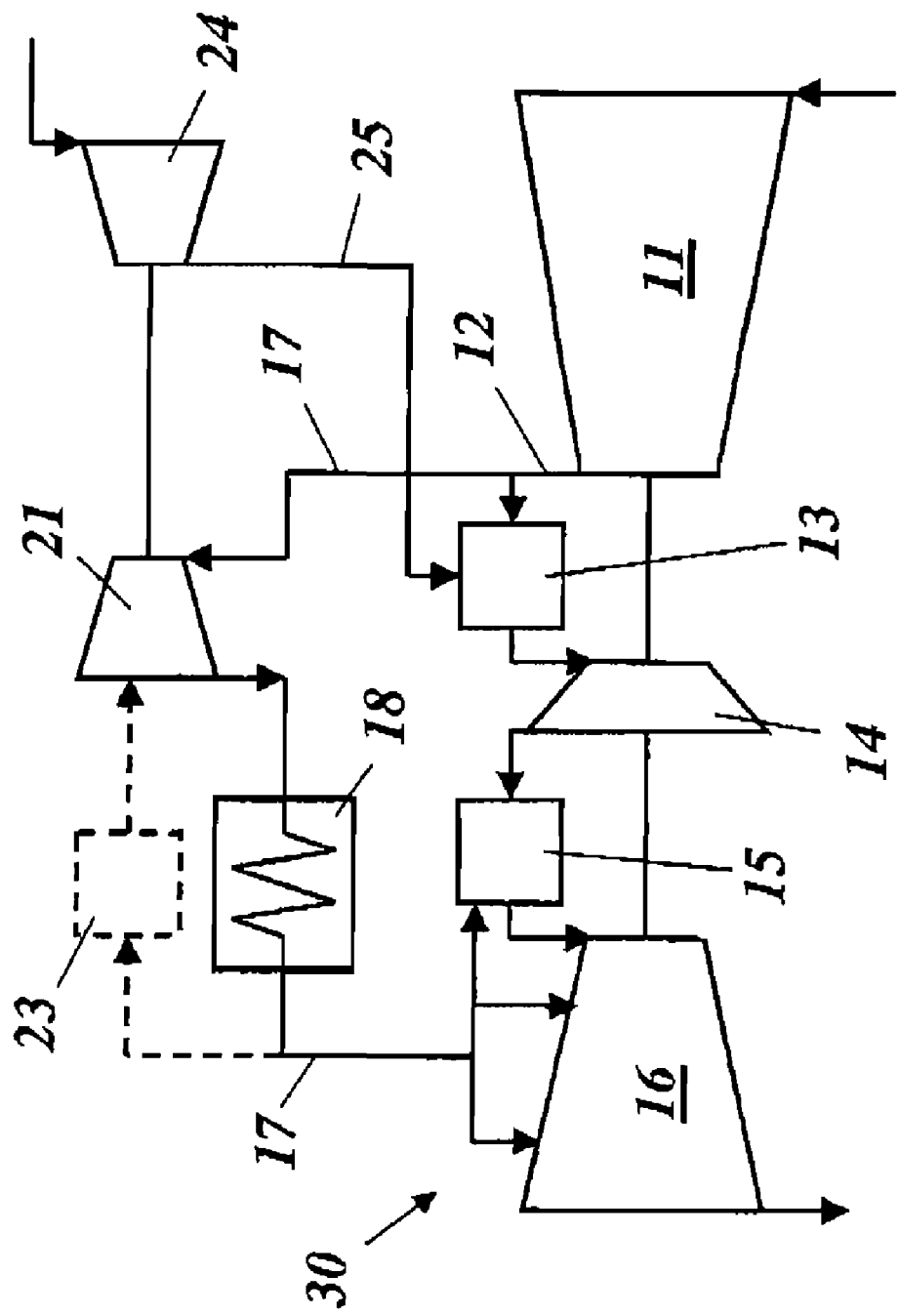
FIG. 3 shows a second exemplary embodiment of a gas turbine according to the invention, in a representation comparable to FIG. 1, with an additional turbine in the cooling air duct, which drives a fuel compressor.

In FIG. 3, a second exemplary embodiment of a gas turbine 30 according to the invention, in which the additional turbine 21 in the cooling air duct 17 drives a gas compressor 24 which compresses gaseous fuel for the fuel chamber 13, is reproduced in a representation comparable to FIG. 1. This process allows the exergy to be used for the necessary compression of the gaseous fuel.

Figure 4:
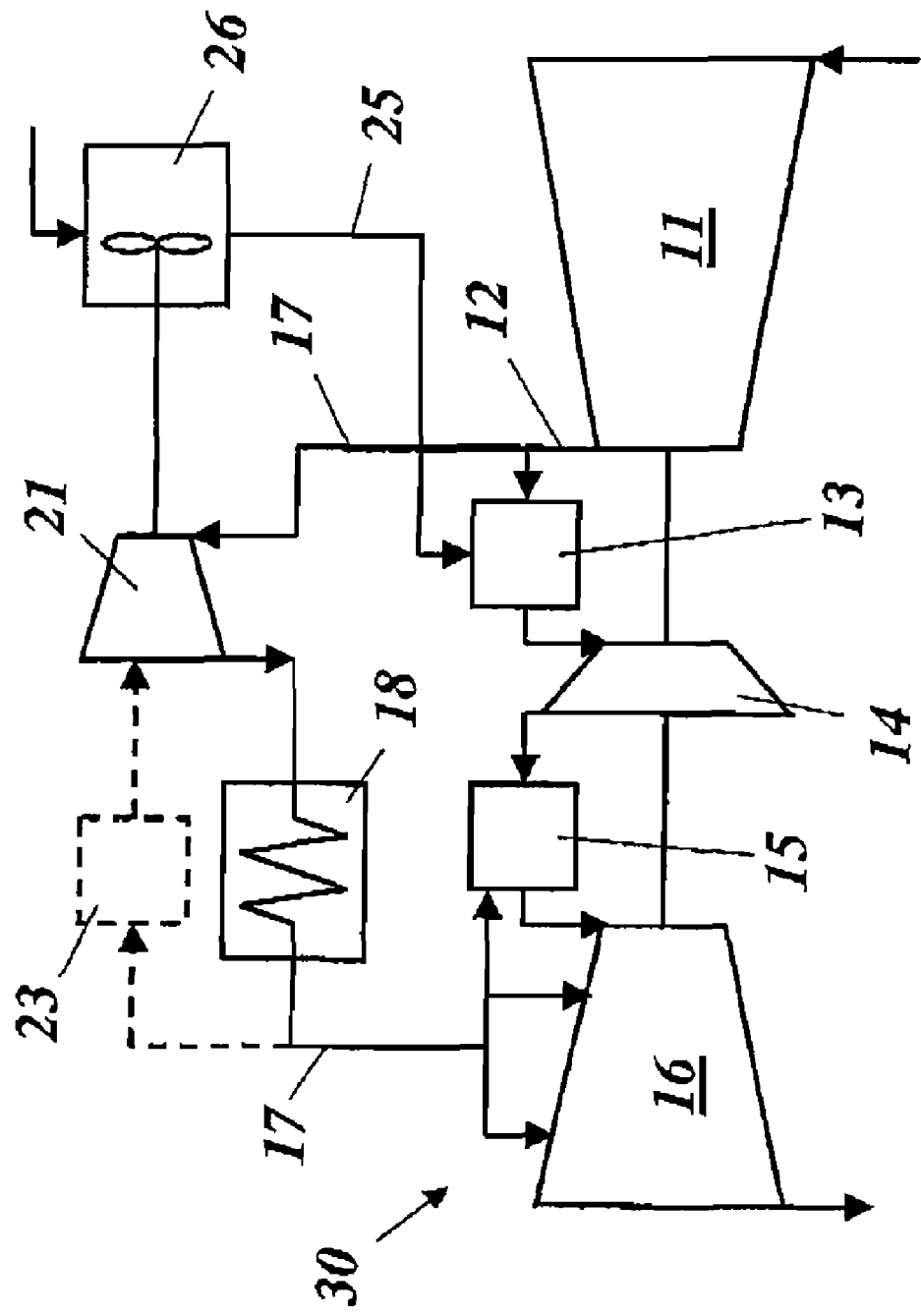
FIG. 4 shows a third exemplary embodiment of a gas turbine according to the invention, in a representation comparable to FIG. 1, with an additional turbine in the cooling air duct, which drives a fuel preheating device.

In FIG. 4, a third exemplary embodiment of a gas turbine 30 according to the invention, in which the additional turbine in the cooling air duct drives a fuel preheating device 26 which is arranged in the fuel line 25 to the combustion chamber 13, is reproduced in a representation comparable to FIG. 1. The shaft output of the turbine 21 is thereby converted into thermal power, which heats the preferably liquid fuel and so improves the efficiency of the gas turbine.

What is claimed is:

1. A gas turbine comprising:
   a compressor configured to compress combustion air;
   at least one combustion chamber, a first portion of the compressed combustion air being supplied to the at least one combustion chamber and a fuel being burned in the at least one combustion chamber;
   at least one first turbine disposed downstream of the combustion chamber, hot combustion gases from the combustion chamber being expanded in the at least one first turbine so as to perform work;
   a cooling air cooler, wherein a second portion of the compressed combustion air is branched off and cooled in the cooling air cooler so as to generate cooling air; and
   a second turbine configured to lower a pressure of the cooling air and to supply the cooling air for cooling purposes, wherein the second turbine is disposed upstream of the cooling air cooler, and wherein the second portion of the compressed combustion air is provided from the cooling air cooler to the at least one first turbine.

2. The gas turbine as recited in claim 1, wherein the second turbine is controllable.

3. The gas turbine as recited in claim 2, further comprising a regulating device configured to control the second turbine so as to regulate the pressure of the cooling air.

4. The gas turbine as recited in claim 1, further comprising a generator, the second turbine driving the generator.

5. The gas turbine as recited in claim 1, further comprising a gas compressor, wherein the fuel is a gas and the second turbine drives the gas compressor so as to compress the fuel.

6. The gas turbine as recited in claim 1, further comprising a fuel preheating device configured to heat the fuel by conversion of kinetic energy into heat, the second turbine driving the fuel preheating device.

7. The gas turbine as recited in claim 6, wherein the fuel is a liquid fuel.

8. The gas turbine as recited in claim 1, wherein the at least one combustion chamber includes two combustion chambers and wherein the at least one first turbine includes two first turbines.

\* \* \* \* \*